(12) United States Patent
Tesch et al.

(10) Patent No.: US 6,454,296 B1
(45) Date of Patent: Sep. 24, 2002

(54) SIDE AIR BAG FOR ROLL-OVER RESTRAINT

(75) Inventors: Todd E Tesch, Tipp City; Solomon I Islam, West Carrolton; Scott A. Stober, Tipp City; Sharon K Melia, Kettering; Robert Raymond Niederman, Dayton, all of OH (US); Jeffrey Allen Welch, Washington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/721,054

(22) Filed: Nov. 22, 2000

(51) Int. Cl.$^7$ ................................................. B60R 21/22

(52) U.S. Cl. ................................ 280/730.2; 280/743.2; 280/749

(58) Field of Search ..................... 280/730.2, 749, 280/743.1, 743.2

(56) References Cited

U.S. PATENT DOCUMENTS

| 5,333,898 | A | * | 8/1994 | Stutz ........................ 280/743.1 |
| 5,462,308 | A | * | 10/1995 | Seki et al. ................ 280/730.2 |
| 5,588,672 | A | * | 12/1996 | Karlow et al. ........... 280/730.2 |
| 5,865,462 | A | * | 2/1999 | Robins et al. ............... 280/749 |
| 5,924,723 | A | * | 7/1999 | Brantman et al. ........ 280/730.2 |
| 6,149,195 | A | * | 11/2000 | Faigle ..................... 280/730.2 |
| 6,176,513 | B1 | * | 1/2001 | Neidert ................... 280/730.2 |
| 6,273,458 | B1 | * | 8/2001 | Steffens, Jr. et al. ........ 280/749 |

* cited by examiner

Primary Examiner—Eric Culbreth
(74) Attorney, Agent, or Firm—Kathryn A. Marra

(57) ABSTRACT

An inflatable restraint assembly including an inflatable curtain structure deployable from a storage position along the roof rail of the vehicle so as to extend downwardly over an area within the vehicle interior adjacent to an occupant to be protected. The inflatable curtain structure is deployed downwardly along a deployment path from its storage location along the roof rail of the vehicle in substantially nonobstructing relation to shoulder harness structures and is thereafter anchored over the covered area in a substantially tensioned configuration.

13 Claims, 5 Drawing Sheets

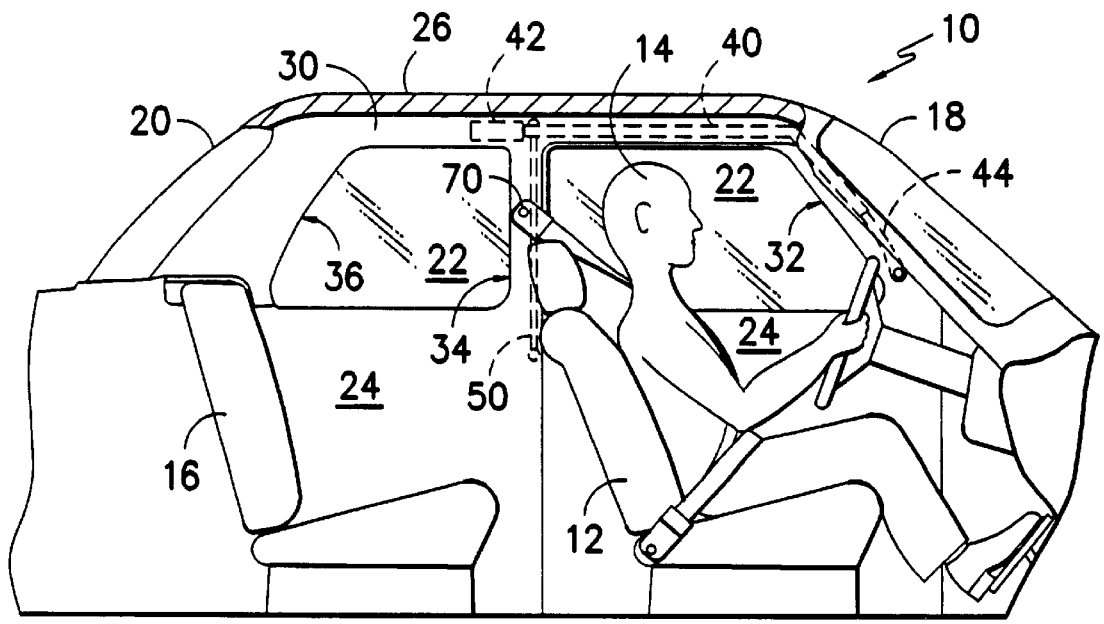
FIG. -1-
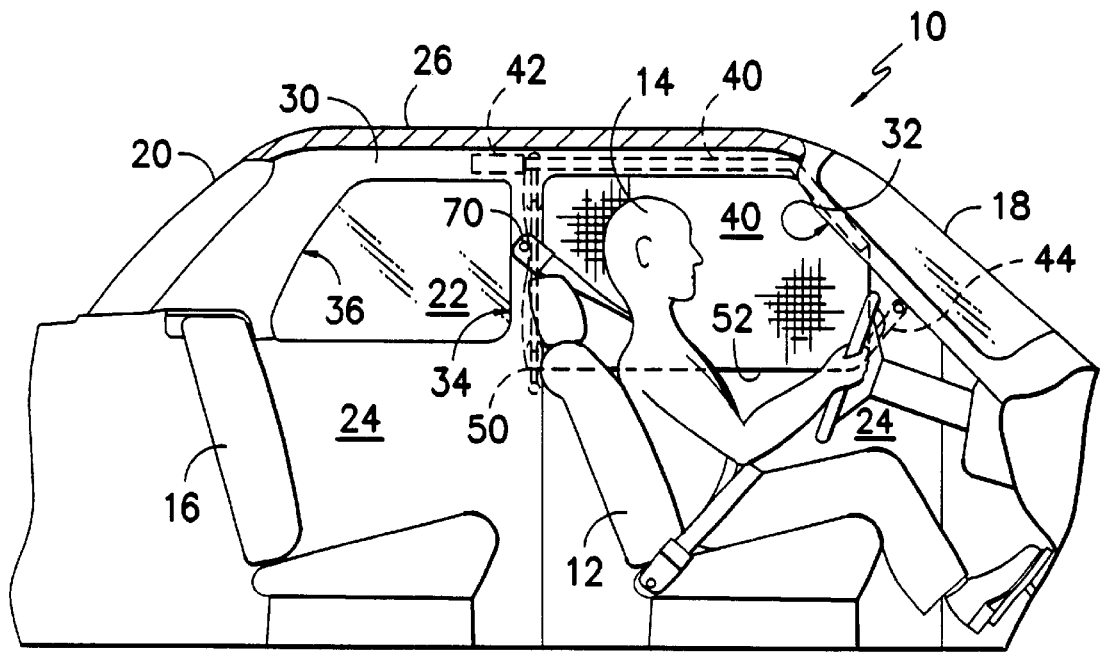
FIG. -2-

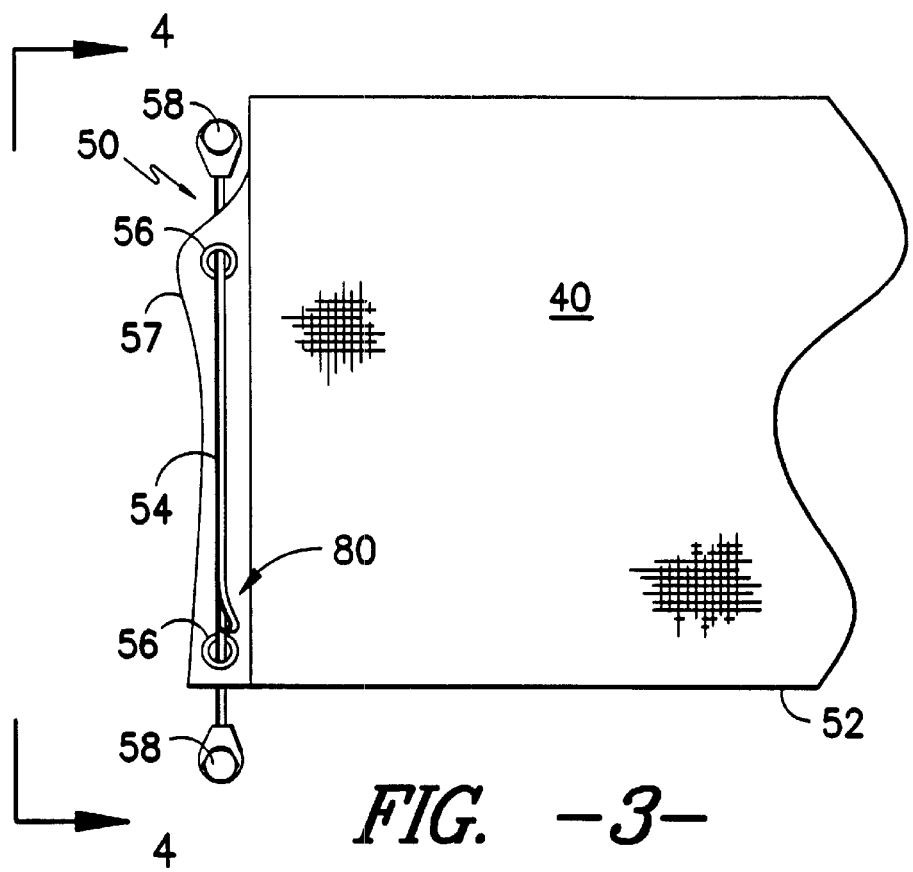
FIG. -3-
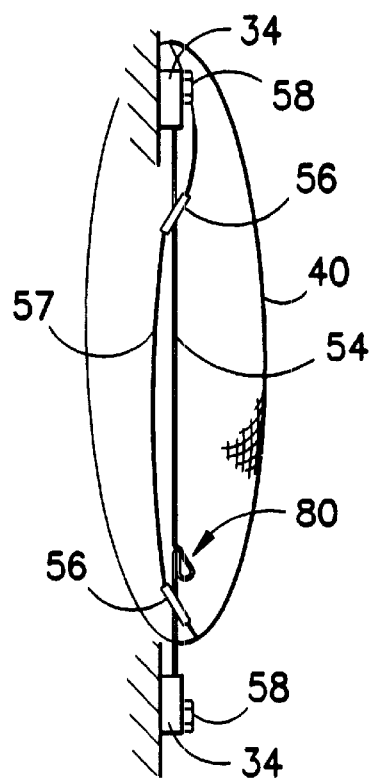
FIG. -4-

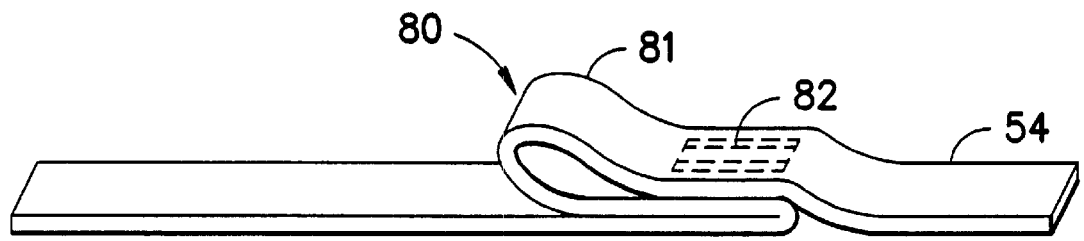
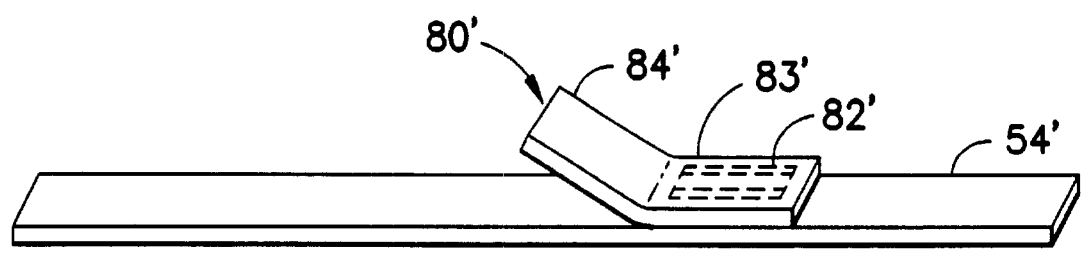
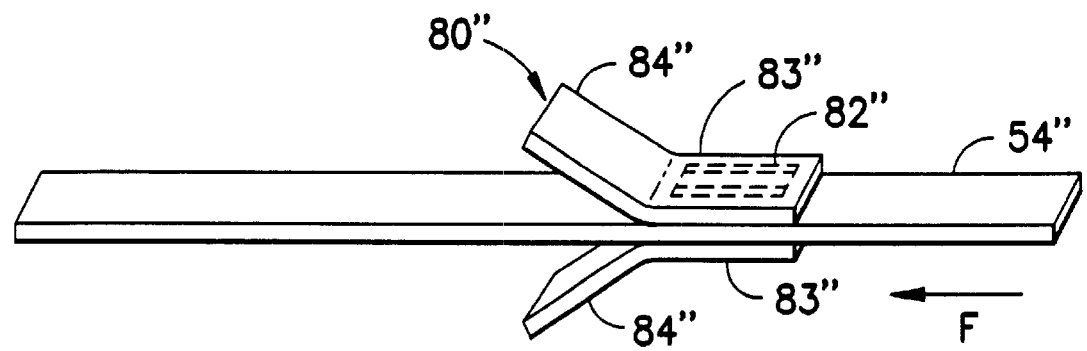
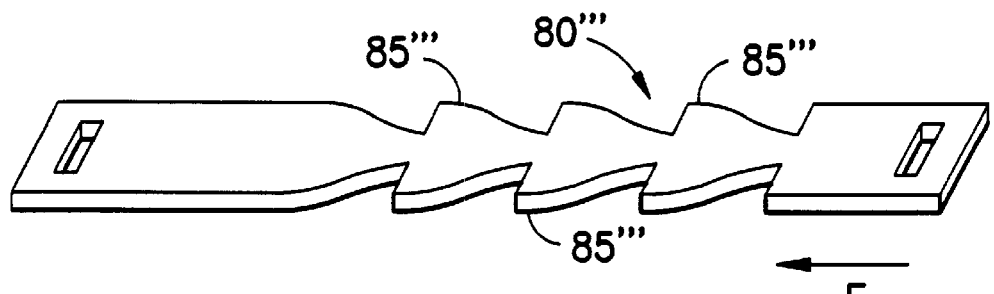

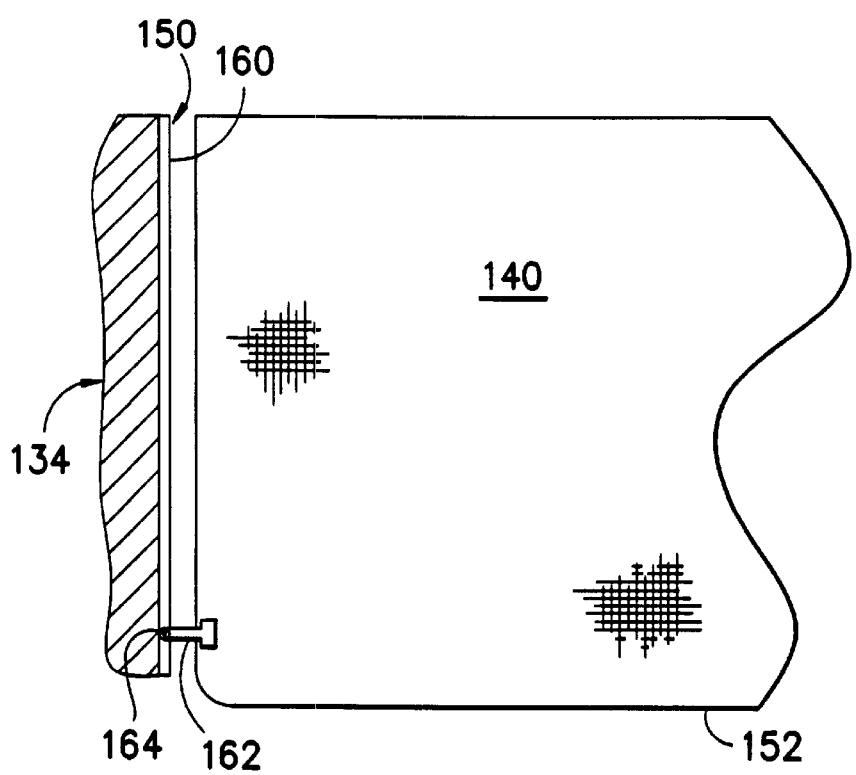
FIG. -6-
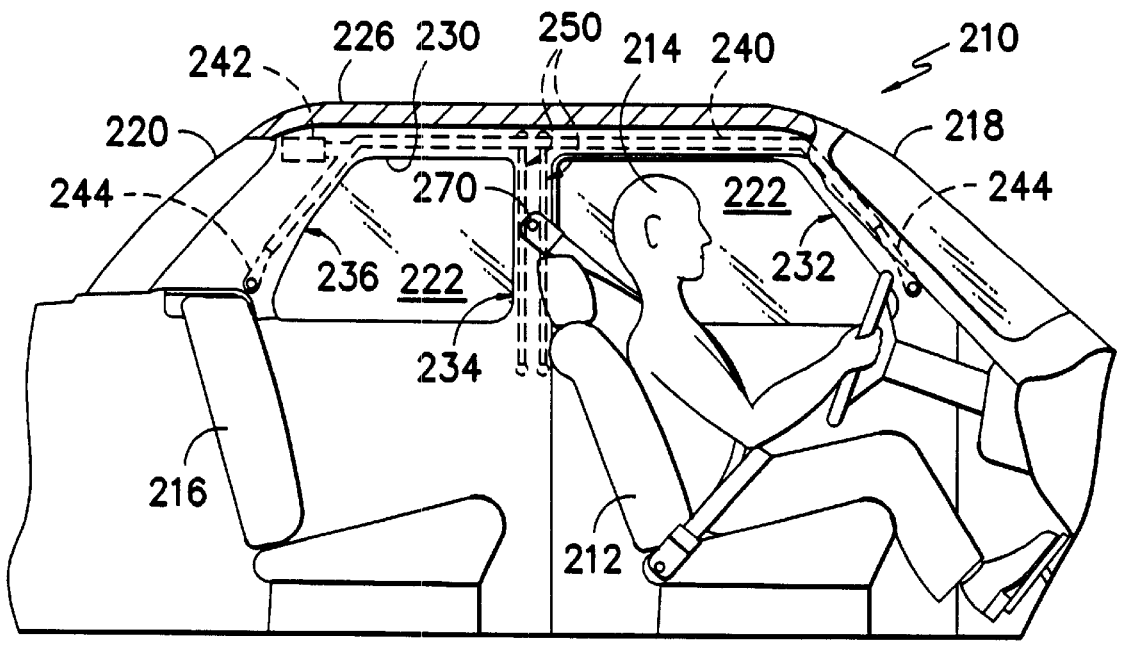
FIG. -7-

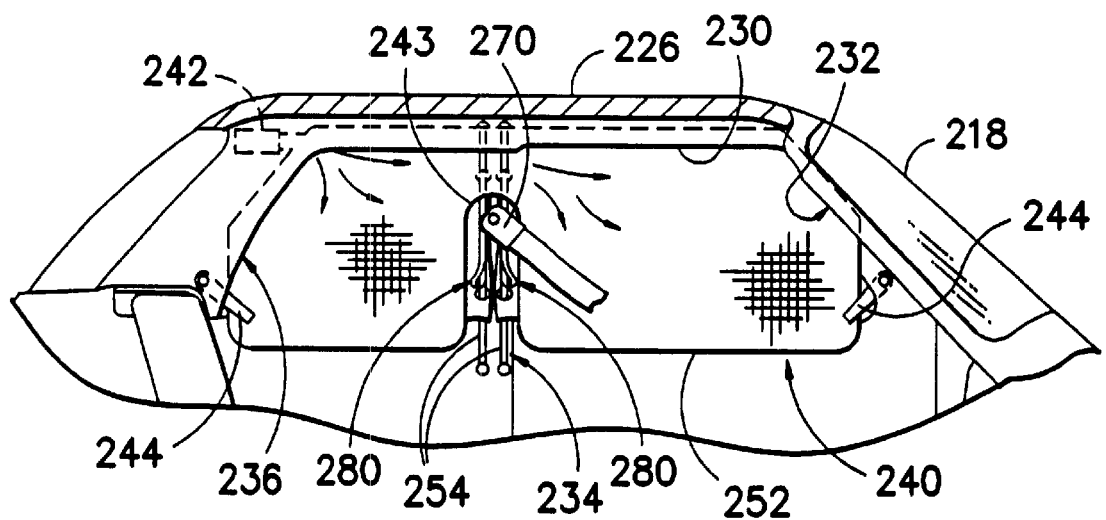
FIG. -8-
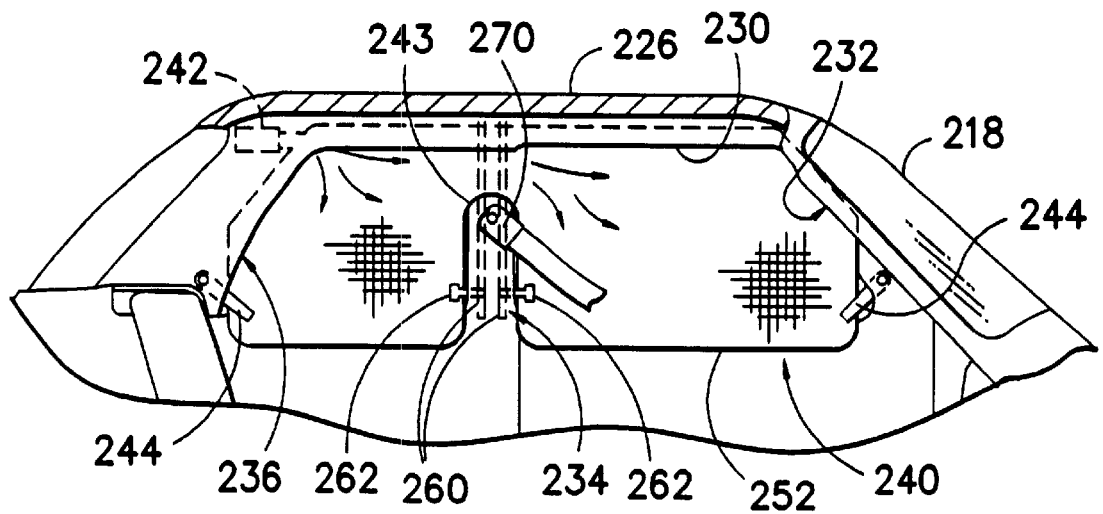
FIG. -9-

SIDE AIR BAG FOR ROLL-OVER RESTRAINT

TECHNICAL FIELD

The present invention relates to an inflatable restraint assembly useful within the interior of a transportation vehicle to cover a side portion of the vehicle interior adjacent to an occupant to be protected during a collision event. More particularly, the invention relates to an air bag cushion deployable from a position over the door frame of the vehicle downwardly over a portion of the vehicle interior in a predetermined deployment path adjacent to the occupant to be protected. The present invention also provides an air bag cushion which is inflatable downwardly from a storage position over the door frame of the vehicle over a broad expanse to the side of an occupant to be protected while substantially avoiding interference with any shoulder harness restraint which may be attached to the side portion of the vehicle interior.

BACKGROUND OF THE INVENTION

It is well known in motor vehicles to provide air bag cushions for protecting a vehicle occupant during a collision event wherein such air bag cushions are in fluid communication with gas generating inflators so as to inflate the cushions upon sensing predetermined vehicle conditions such as deceleration exceeding a certain level. It is further known to provide air bag systems including inflatable restraint cushions which are deployed from positions of attachment along the roof rail portion of the vehicle frame above the doors of the vehicle such that the inflatable restraint cushion extends downwardly in substantially curtain-like fashion between the occupant to be protected and the side portions of the vehicle adjacent to such occupant. Such coverage is intended to provide cushioning restraint for the occupant during a side impact or an extended roll-over collision event.

It is believed to be generally desirable for a curtain-like side air bag cushion to be held in a substantially tensioned condition across the surface being covered so as to provide a well defined barrier between the occupant and the covered region. Such a condition is believed to be useful in holding the vehicle occupant within the vehicle during an extended roll-over event. In the past, it has been proposed to fixedly attach the lower edges of the curtain-like air bag cushions to opposing fixed positions along the vehicle frame below the roof rail. However, such a configuration may result in an excessive length of material extending along the lower edge of the curtain-like structure between the lower most points of attachment once deployment takes place.

The length of the lower edge of the cushion extending between points of attachment to the vehicle frame may be shortened to some degree through inflation of elongate gas receiving chambers running from the top of the curtain to the lower edge. However, such a technique to obtain the desired taut orientation over the covered area may require an excessive amount of material and labor in construction and may further require a larger quantity of inflation gas to inflate the cushion to the desired tensioned orientation than would otherwise be required to obtain the desired cushioning and restraining characteristics.

Prior curtain-like air bag cushions deployable from storage positions above the door frame have also been difficult to deploy over extended areas adjacent to the occupant to be protected due to interference from elements extending outwardly from the regions to be covered. In particular, in the event that such curtain-like cushions are intended to cover regions which include a shoulder harness attachment, the deployment of such a cushion structure may be obstructed by the shoulder harness assembly which thereby prevents the cushion from assuming a completely taut configuration along its lower edge.

SUMMARY OF THE INVENTION

This invention provides advantages and alternatives over the prior art by providing an inflatable restraint assembly including an inflatable curtain structure deployable from a storage position along the roof rail of the vehicle so as to extend downwardly over an area within the vehicle interior adjacent to an occupant to be protected. The inflatable curtain structure is operatively connected to a guide element which guides the inflatable curtain structure downwardly from its storage location along the roof rail of the vehicle and thereafter serves to anchor the curtain structure over the covered area in a substantially tensioned configuration. Due to the presence of the guide element, a separate fixed attachment between the lower edge of the inflatable curtain structure and the vehicle frame may be eliminated thereby simplifying the storage of the inflatable curtain structure prior to deployment.

According to one potentially preferred aspect of the present invention, an inflatable restraint assembly is provided including an inflatable curtain structure which may be deployed downwardly from a position of storage along the roof rail of the vehicle in covering relation over an area substantially between the "A" pillar and the "B" pillar of the vehicle frame with a tensioning guide element being disposed substantially over the "B" pillar such that the inflatable curtain structure travels downwardly from its storage position along the tensioning guide element and is thereafter held in tension between the "A" pillar and the guide element at the "B" pillar.

According to another potentially preferred aspect of the present invention, an inflatable restraint assembly is provided which includes an inflatable curtain structure which may be guided downwardly away from a storage position along the roof rail of the vehicle by a tensioning guide element in the form of an elongate lace structure in sliding engagement with the inflatable curtain structure such that during inflation the inflatable curtain structure travels downwardly along the elongate lace element. The inflatable curtain structure is thereafter anchored in static tension along its lower edge between the elongate lace element and a point of attachment on the vehicle frame to which-the other end of the lower edge of the curtain structure is attached. The inflatable curtain structure may be held in its full deployed position by a directional locking element disposed along the guide element which prevents curtain from retreating upwardly along the guide element following deployment.

According to another aspect of the present invention, an inflatable restraint assembly is provided including an inflatable curtain structure which may be guided downwardly away from a storage position along the roof rail of the vehicle by a tensioning guide element in the form of a tether accepting channel in sliding engagement with a tethering element fixedly attached to the inflatable curtain structure such that the tethering element slides downwardly along the tether accepting channel during deployment of the inflatable cushion and is thereafter held in tensioned relation within the channel once inflation is complete such that the inflatable curtain structure is stretched over a region between the tether accepting channel and an opposing point of attachment to the vehicle frame.

According to still a further potentially preferred aspect of the present invention, an inflatable restraint assembly is provided including an inflatable curtain structure of substantially segmented construction which may be deployed over an expanse between the "A" pillar and the "C" pillar of a vehicle frame substantially without encountering interference from a shoulder harness attached at an intermediate location between the "A" pillar and the "C" pillar. A single inflator may nonetheless be utilized to inflate such an inflatable curtain structure by maintaining a common inflation chamber in the region between the segmented sections of the curtain structure. The segmentation of the inflatable curtain structure permits each segment to be operatively connected to a travel guide element extending along the "B" pillar of the vehicle so as to permit the controlled downward deployment of the segmented curtain structure and the subsequent tensioned restraint along the lower edge of the inflatable curtain structure across the covered region.

BRIEF DESCRIPTION OF THE DRAWINGS

The accompanying drawings which are incorporated in and which constitute a part of this specification illustrate several potentially preferred embodiments of the present invention and, together with a general description of the invention given above and the detailed description set forth below, serve to explain the principles of the invention wherein:

FIG. 1 is a cut-away view of the interior of an automotive vehicle incorporating an embodiment of the inflatable restraint assembly according to the present invention;

FIG. 2 is a view similar to FIG. 1 following activation of the inflatable restraint assembly;

FIG. 3 illustrates the operative connection between an inflatable curtain structure and a travel guide element in the form of a lace structure in an inflatable restraint assembly according to the present invention;

FIG. 4 is a view taken generally along line 4—4 of FIG. 3 with the inflatable curtain structure in a fully deployed state.

FIGS. 5A–5D illustrate various configurations for directional locking elements for use in conjunction with elongate travel guide elements.

FIG. 6 illustrates the operative connection between an inflatable curtain structure and a travel guide element in the form of a tether accepting slide channel in an inflatable restraint assembly according to the present invention;

FIG. 7 is a view similar to FIG. 1 illustrating an alternative embodiment of the inflatable restraint assembly according to the present invention in a stored position prior to activation;

FIG. 8 illustrates the inflatable restraint assembly of FIG. 7 in a deployed state and incorporating the elongate travel guide elements as illustrated in FIG. 3; and FIG. 9 is a view similar to FIG. 8 but incorporating the travel guide elements of FIG. 6.

While the invention has been illustrated and generally described above and will hereinafter be described in connection with certain potentially preferred embodiments, it is to be understood and appreciated that in no event is the invention to be limited to such illustrated and described embodiments. On the contrary, it is intended that the present invention shall extend to all alternatives and modifications as may embrace the broad principles of this invention within the true spirit and scope thereof.

DESCRIPTION OF THE PREFERRED EMBODIMENTS

Turning now to the drawings wherein like reference numerals have been utilized to designate like components throughout the various views, in FIG. 1 there is illustrated a vehicle 10. The vehicle 10 includes a front seat 12 which may be used to support a front seated vehicle occupant 14. The vehicle 10 may further include a rear seat 16 which may be used to support a rear occupant (not shown). While the front seat 12 and the rear seat 16 are illustrated as being located on the driver's side of the vehicle 10, it is to be appreciated that the present invention is also useful in the protection of an occupant (not shown) seated in either the front seat or rear seat on the passenger side of the vehicle 10. Moreover, while the vehicle 10 is illustrated as housing two rows of seats 12, 16 it is likewise contemplated that the vehicle 10 may house only a single row of seats 12 or may likewise include three or more rows of seats if desired. In order to provide visibility to the occupants of the vehicle 10, the vehicle 10 is preferably provided with a windshield 18 and with a rear view window 20. The vehicle 10 may also be provided with one or more side windows 22 disposed within doors 24 which extend adjacent to the vehicle occupants towards a roof 26.

As will be appreciated by those of skill in the art, the vehicle 10 preferably includes a structural frame formed from an arrangement of support members including a roof rail 30 disposed intermediate the doors 24 and the roof 26. According to the illustrated embodiment, the vehicle 10 also includes a series of structural pillars 32, 34, 36 which extend downwardly from the roof rail 30. Of course, it will be appreciated that a greater or lesser number of pillars may be utilized depending upon the configuration of the vehicle 10. The structural pillar 32 which extends between the windshield 18 and the side window 22 adjacent to the front seat 12 is commonly referred to as the "A" pillar. The structural pillar 34 which is disposed rearwardly of the "A" pillar and between the side windows 22 is commonly referred to as the "B" pillar. The structural support pillar 36 which is disposed rearward of the side windows 22 adjacent to the rear seat 16 is commonly referred to as the "C" pillar. As will be appreciated, each of the structural support pillars 32, 34, 36 is preferably covered by a trim piece which extends in elongate fashion away from the roof rail 30. The roof rail 30 is likewise preferably covered by an appropriate trim piece or headlining material in a manner well known to those of skill in the art.

As illustrated, according to a first potentially preferred embodiment, it is contemplated that an air bag cushion in the form of an inflatable curtain structure 40 may be stored in rolled or folded fashion along the roof rail in a region above the doors 24 adjacent to the occupant to be protected. As shown, it is contemplated that portions of the inflatable curtain structure 40 may also be stored along a segment of the "A" pillar 32 if desired thereby assuming a curved storage profile. The inflatable curtain structure 40 is preferably in fluid communication with a gas discharging inflator 42 as will be well known to those of skill in the art such that gas may be discharged from the inflator 42 and into the inflatable curtain structure 40 so as to effect deployment of the inflatable curtain structure 40 upon the occurrence of predetermined vehicle conditions which are measured by appropriate sensors (not shown).

According to the illustrated and potentially preferred practice, the inflatable curtain structure 40 is attached to a tethering element 44 which is secured in fixed relation along the "A" pillar 32 below the roof rail. As will be described further hereinafter, a substantially linear elongate travel guide element 50 which is operatively connected to the inflatable curtain structure 40 preferably extends downwardly away from the roof rail 30 in the region of the "B"

pillar as shown. As will be appreciated, the inflatable curtain structure 40, the inflator 42, the tethering element 44, and the travel guide element 50 are all preferably hidden from view by overlying trim and will thus be substantially hidden from view prior to inflation of the inflatable curtain structure 40.

Referring now to FIG. 2, the inflatable curtain structure 40 is illustrated in a deployed state extending over a region of the vehicle interior substantially adjacent to the occupant 14. As illustrated, this region of coverage preferably extends to a location extending below the window 22 so as to provide coverage over that area in the event that the window 22 is broken. According to the potentially preferred arrangement, in the deployed configuration it is contemplated that the inflatable curtain structure 40 will be stretched tightly over the region of coverage such that the lower edge 52 of the curtain structure 40 is held in static tension between the tethering element 44 and the travel guide element 50. As illustrated, according to a potentially preferred arrangement, the travel guide element 50 is disposed in elongate fashion substantially along the edge of the "B" pillar 34 such that the downward conveyance of the inflatable curtain structure along the travel guide element 50 is carried out substantially without interference from a shoulder harness structure 70 extending outwardly from the interior of the "B" pillar 34.

As illustrated in FIG. 3, according to one potentially preferred embodiment, it is contemplated that the travel guide element 50 may include an elongate lace element 54 which is threaded through one or more eyelet openings 56 disposed through a lateral edge portion 57 of the inflatable curtain structure 40. It is contemplated that the elongate lace element 54 may be either flexible or stiff in nature although a flexible strap-like or cord-like structure may be preferred. A strap-like structure of textile material such as nylon 6,6 may be particularly preferred. As shown, according to a potentially preferred practice it is contemplated that the lateral edge portion 57 housing the eyelet openings 56 may be a substantially flat tab-like structure which does not undergo inflation during deployment of the inflatable curtain structure 40. As shown, the elongate lace element 54 is preferably held in place at its upper and lower ends by bolts 58 or other appropriate fastening devices which are secured to the underlying "B" pillar 34 or other appropriate support surface.

According to the embodiment illustrated in FIG. 3, a directional locking element 80 is disposed at the lower portion of the elongate lace element 54. According to the potentially preferred construction the directional locking element 80 is of a compressible flare configuration arranged so as to permit at least one eyelet opening 56 to pass over the directional locking element 80 as the inflatable curtain structure is deployed downwardly over the windows 22. The flare of the directional locking element 80 thereafter obstructs any retreat of the previously passed eyelet opening 56 thereby substantially preventing the inflatable curtain structure 40 from moving back up the elongate lace element 54 once the lower edge 52 of the inflatable curtain structure 40 is in place.

It is contemplated that the directional locking element 80 may be of a number of different configurations. By way of example only and not limitation, several exemplary constructions are illustrated in FIGS. 5A–5D. As shown in FIG. 5A, according to one embodiment it is contemplated that the directional locking element 80 may employ an outwardly projecting loop 81 formed within the substantially strap-like material making up the elongate lace element 54. One or more seams 82 such as stitched seams or the like may be utilized to maintain the loop 81 in place.

As illustrated in FIG. 5B, wherein elements corresponding to previously described structures are designated by like reference numerals with a prime, another potential embodiment for a directional locking element 80' incorporates the stitched application of an independent flare member 83' to one side of the strap-like material forming the elongate lace element 54'. As shown, the independent flare member 83' preferably includes a tongue portion 84' which normally projects away from the surface of the elongate lace element 54' but which may be bent downwardly towards the surface of the elongate lace element 54' when force is applied in a direction corresponding with the desired travel path of the inflatable curtain structure.

As illustrated in FIG. 5C, wherein elements corresponding to previously described structures are designated by like reference numerals with a double prime, yet another potential embodiment for a directional locking element 80" incorporates the stitched application of an independent flare member 83" to opposing sides of the strap-like material forming the elongate lace element 54". As shown, such independent flare members 83" include tongue portions 84" which normally project away from the surface of the elongate lace element 54" but which may be bent downwardly towards the surface of the elongate lace element 54" when force is applied in a direction corresponding to the desired travel path of the inflatable curtain structure.

It is contemplated that the independent flare members 83', 83" may be formed from a material which is either similar or dissimilar to the material forming the elongate lace element 54', 54". Accordingly, by way of example only and not limitation, it is contemplated that the such independent flare members may be formed from materials such as woven textiles as well as from materials such as relatively thin plastic or the like.

In FIG. 5D there is illustrated yet another potential embodiment of a directional locking element 80'''. As shown, in this embodiment, the directional locking element 80''' incorporates a plurality of substantially saw tooth flared locking segments 85''' arranged in a head to tail configuration so as to compress inwardly and allow an eyelet 56 to pass in one direction corresponding to the desired travel path of the curtain structure but to substantially obstruct any retreat in the opposite direction.

Another potential embodiment of the travel guide element for use in the inflatable restraint assembly according to the present invention is illustrated in FIG. 4 wherein elements similar to those illustrated in FIG. 3 are denoted by like reference numerals increased by 100. As shown, it is contemplated that the travel guide element 150 may be made up of a groove element 160 for acceptance of a tethering element 162 attached near the lower edge 152 of an inflatable curtain structure 140. The tethering element 162 will preferably include an enlarged head portion 164 in the form of a bead structure or the like for travel within the groove element 160 but which is nonetheless held in place within the groove element 160 upon the application of tension to the tethering element 162.

According to the potentially preferred practice, it is contemplated that the deployment of the inflatable curtain structure will be carried out in a substantially similar manner without regard to the actual configuration of the travel guide element 50, 150 as may be used. In particular, it is contemplated that as inflation gas exits the gas discharging inflator 42 and enters the inflatable curtain structure 40, 140 the inflatable curtain structure 40, 140 will expand downwardly away from its position of confinement along the vehicle frame structure and will extend over at least a portion of the region below the roof rail 30 adjacent to the occupant to be protected. As the inflatable curtain structure 40, 140 moves downwardly over the region to be covered, the travel guide element 50, 150 guides the curtain structure along a desired path of deployment so as to promote proper positioning and to avoid interference with any shoulder harness attachment mechanism 70. As the deployment of the inflatable curtain structure 40, 140 is completed, the expansion caused by the introduction of the inflation gas gives rise to a naturally occurring shortening of the lower edge 52, 152 thereby placing the lower edge 52, 152 into a state of tension between its points of attachment to the travel guide element 50, 150 and to the "A" pillar 32. The travel guide element 50, 150 thereby serves the dual functions of guiding the inflatable curtain structure 40, 140 into the desired position over the region to be covered and of holding the inflatable curtain structure 40, 140 in tension over the covered region once inflation has taken place.

It is to be understood and appreciated that while the deployment of the inflatable curtain structure 40, 140 has been illustrated and described in relation to coverage between the "A" pillar 32 and the "B" pillar 34 that substantially similar deployment is contemplated and may be carried out in the region between the "B" pillar 34 and the "C" pillar 36 by simply running the travel guide element 50 along the "B" pillar in a line extending rearward of the shoulder harness attachment mechanism 70 and providing the inflatable curtain structure with a point of attachment to the "C" pillar 36 such that the lower edge of such cushion is stretched between the "B" pillar 34 and the "C" pillar 36 upon achieving expanded deployment.

In the event that coverage is desired over a span extending across more than one door 24, it is contemplated that such coverage is preferably achieved substantially without the occurrence of interference between the inflatable restraint assembly and any shoulder harness assembly 70 as may be utilized by the vehicle occupants. While it is contemplated that such interference may be avoided by utilizing a multiplicity of substantially independent inflatable curtain structures 40, 140 as previously described with the shoulder harness attachment mechanism 70 located between such inflatable curtain structures it is likewise contemplated that such coverage may be achieved by an inflatable restraint assembly incorporating a single inflatable curtain structure in the manner as illustrated in FIGS. 7–9 wherein elements similar to those described in relation to FIG. 1 are denoted by like reference numerals increased by 200.

As shown in FIG. 7, an inflatable curtain structure 240 is preferably disposed in stored relation along the roof rail 230 including the region above the "B" pillar 234 supporting the shoulder harness attachment mechanism 270. Portions of the stored inflatable curtain structure 240 may also extend along the "A" pillar 232 and the "C" pillar 236 for attachment to tethering elements 244. The inflatable curtain structure 240 is preferably in fluid communication with a single gas discharging inflator 242 such that upon discharge of gas from the inflator 242, the inflatable curtain structure 240 will be deployed downwardly from the roof rail 230 and over an expansive region adjacent to the occupant seating compartment.

As best illustrated through simultaneous reference to FIGS. 8 and 9, the inflatable curtain structure 240 is preferably of a substantially segmented construction including a cloven gap structure 243 extending from the lower edge 252 upwardly into the interior of the inflatable curtain structure 240 such that the shoulder harness attachment mechanism 270 resides within the cloven gap structure 243 upon deployment of the inflatable curtain structure 240. The segmented construction of the inflatable curtain structure 240 thus permits the inflatable curtain structure 240 to pass over the shoulder harness attachment mechanism 270 in wrap-around relationship substantially without the occurrence of interference between the curtain structure 240 and the shoulder harness attachment mechanism 270 during deployment.

According to the illustrated and potentially preferred arrangement, it is contemplated that each lateral side of the cloven gap structure 243 will preferably be operatively connected to a substantially parallel elongate guide element 250 in the form of either a lace structure 254 (FIG. 8) or in the form of a groove element 260 which accepts a cooperating sliding tether element 262 connected to the curtain structure 240 (FIG. 9). As shown, the cloven gap structure 243 preferably does not extend upwardly through the entire inflatable curtain structure 240. Thus, fluid communication is preferably maintained between the segments of the inflatable curtain structure 240 thereby permitting a single gas discharging inflator 242 to be utilized to effect deployment.

As will be appreciated, in order to permit the inflatable curtain structure 40, 140, 240 to be folded into a hidden confined space, it is desirable that the materials of construction forming such inflatable curtain structure be of a substantially pliable nature. In this regard, films or textile fabrics may represent potentially preferred materials of construction. Woven or knitted textile fabrics of nylon or polyester may be particularly preferred. It is contemplated that suitable structures may be formed by adjoining panels of such material around a perimeter edge to form a substantially gas tight enclosure so as to substantially maintain the inflation gas during an extended roll-over event. In this regard, it is contemplated that the materials forming the inflatable curtain structure 40, 140, 240 may be provided with a permeability blocking coating in the form of a film or dispersion of suitable material such as silicone, polyurethane, or polyamides across the inflatable portions of the curtain structure.

It is to be understood that while the present invention has been illustrated and described above in relation to certain potentially preferred embodiments, constructions, and procedures, that such embodiments, constructions, and procedures are intended to be illustrative only and that the present invention is in no event to be limited thereto. Rather, it is contemplated that modifications and variations which embody the principles of this invention will no doubt occur to those of skill in the art. It is thus contemplated and intended that the present invention shall extend. to all such modifications and variations as may incorporate the broad aspects of the invention within the full spirit and scope of the appended claims and all equivalents thereto.

What is claimed is:

1. In a transportation vehicle, an inflatable restraint assembly disposed within the interior of the transportation vehicle so as to provide a restraining cover over an area adjacent to an occupant during a collision event wherein the vehicle includes a framework comprising a roof rail extending along the roof line of the vehicle, a first pillar element extending away from the roof rail adjacent to a windshield and at least a second pillar element extending away from the roof rail at a location rearward of the first pillar element, the inflatable restraint assembly comprising: an inflatable curtain structure in fluid communication with an inflation unit, the inflatable curtain structure being stored in a region substantially adjacent to the roof line of the vehicle such that upon inflation, the inflatable curtain structure expands downwardly in covering relation to regions within the interior of the vehicle below the roof rail, the inflatable curtain structure being operatively connected to a travel guide element such that the travel guide element guides the inflatable curtain structure downwardly along a predetermined deployment path during inflation and such that upon inflation being completed, the travel guide element thereafter holds the inflatable curtain structure in place in a substantially taut orientation over a portion of the vehicle interior below the roof rail and adjacent to the occupant so as to span at least a portion of the region between the first pillar element and the second pillar element so as to provide a barrier between the occupant and the vehicle interior during an extended roll-over event wherein the travel guide element comprises a flexible elongate lace element in sliding engagement with the inflatable curtain structure, the elongate lace element being disposed along the deployment path of the inflatable curtain structure such that during inflation the inflatable curtain structure travels downwardly along the elongate lace element and wherein a directional locking element is disposed in substantially fixed relation along the elongate lace element so as to hold the inflatable curtain structure in place at a position below the roof rail following deployment.

2. The invention according to claim 1, wherein the directional locking element comprises a loop element formed integral with the elongated lace element.

3. The invention according to claim 1, wherein the directional locking element comprises at least one independent flare member fixedly attached to the elongate lace element.

4. The invention according to claim 1, wherein the directional locking element is of a substantially saw tooth configuration.

5. In a transportation vehicle, an inflatable restraint assembly disposed within the interior of the transportation vehicle so as to provide a restraining cover over an area adjacent to an occupant during a collision event wherein the vehicle includes a framework comprising a roof rail extending along the roof line of the vehicle, and a plurality of pillar elements extending away from the roof rail along the length of the vehicle, the inflatable restraint assembly comprising: an inflatable curtain structure in fluid communication with an inflation unit, the inflatable curtain structure being stored in a region substantially adjacent to the roof line of the vehicle such that upon inflation, the inflatable curtain structure expands downwardly across an expanse within the interior of the vehicle below the e roof rail including a location having an outwardly extending safety harness structure, the inflatable curtain structure being of a substantially segmented construction including a cloven gap structure disposed across the inflatable curtain structure such that upon inflation of the inflatable curtain structure the gap structure is adapted to pass over the safety harness structure so as to substantially avoid interference between the inflatable curtain structure and the safety harness structure.

6. The invention according to claim 5, wherein the gap structure is of a substantially elongate configuration including a pair of lateral sides extending away from the lower edge of the inflatable curtain structure.

7. The invention according to claim 6, wherein the gap structure extends partially but not completely across the inflatable curtain structure.

8. The invention according to claim 6, wherein the lower edge of the inflatable curtain structure is held in tension across the expanse covered by the inflatable curtain structure.

9. In a transportation vehicle, an inflatable restraint assembly disposed within the interior of the transportation vehicle so as to provide a restraining cover over an area adjacent to an occupant during a collision event wherein the vehicle includes a framework comprising a roof rail extending along the roof line of the vehicle, and a plurality of pillar elements extending away from the roof rail along the length of the vehicle, the inflatable restraint assembly comprising: an inflatable curtain structure in fluid communication with an inflation unit, the inflatable curtain structure being stored in a region substantially adjacent to the roof line of the vehicle such that upon inflation, the inflatable curtain structure expands downwardly across an expanse within the interior of the vehicle below the roof rail including a location having an outwardly extending safety harness structure, the inflatable curtain structure being of a substantially segmented construction including a gap structure disposed across the inflatable curtain structure such that upon inflation of the inflatable curtain structure the gap structure is adapted to pass over the safety harness structure so as to substantially avoid interference between the inflatable curtain structure and the safety harness structure, wherein the gap structure is of a substantially elongate configuration including a pair of lateral sides extending away from the lower edge of the inflatable curtain structure and wherein portions of the gap structure are operatively connected to a pair of longitudinally extending travel guide elements such that the lateral sides of the gap structure are guided around the safety harness structure during inflation of the inflatable curtain structure and such that upon inflation being completed, the travel guide elements thereafter hold the inflatable curtain structure in place in a substantially taut orientation such that tension is maintained across the lower edge of the inflatable curtain structure.

10. The invention according to claim 9, wherein the travel guide elements comprise elongate lace elements in sliding engagement with lace accepting elements extending away from the lateral sides of the gap structure.

11. The invention according to claim 10, wherein the elongate lace elements comprise flexible straps.

12. The invention according to claim 9, wherein the travel guide elements comprise tether accepting channels in sliding engagement with tethering elements fixedly attached to portions of the inflatable curtain structure.

13. The invention according to claim 12, wherein the tether accepting channels are disposed along the length of a pillar element on either side of the safety harness structure.

* * * * *